9204X
D. Russel,
No Printed Specification Availal
Reciprocating Saw Mill,
Patented Oct. 27, 1835.
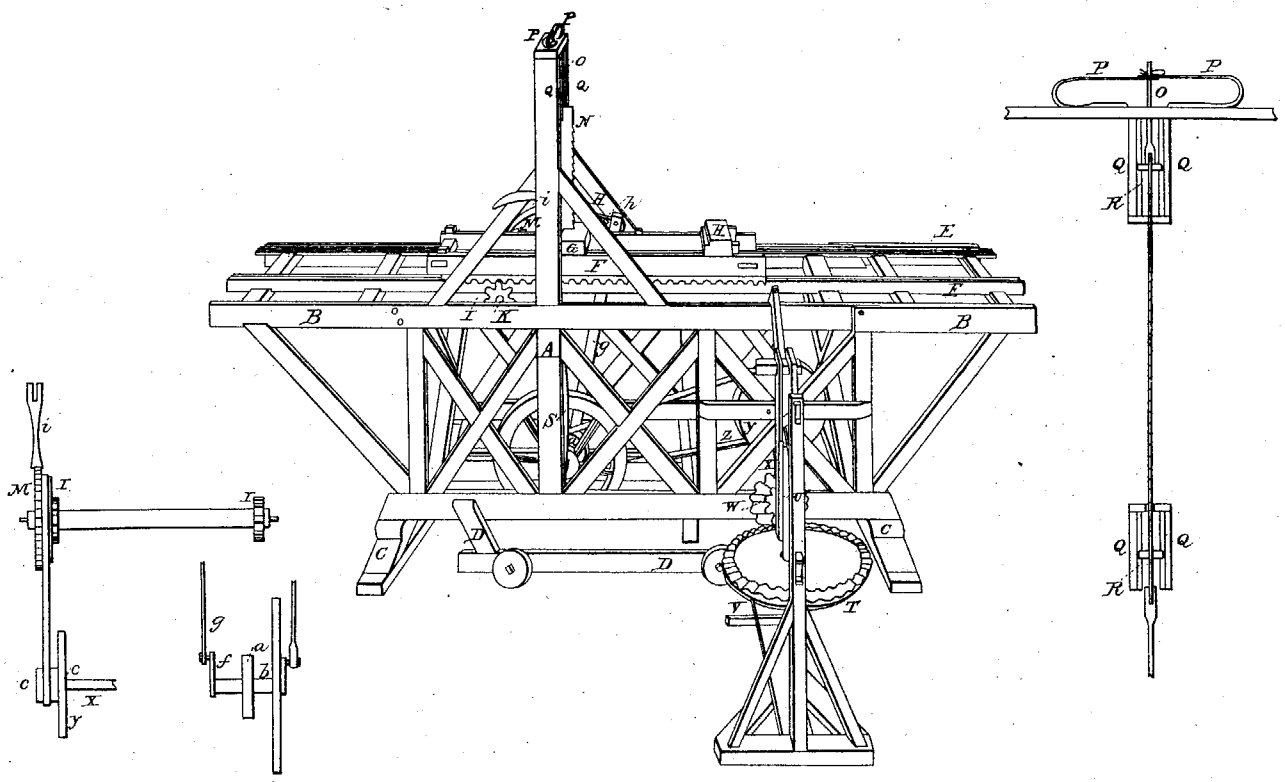
AM. PHOTO-LITHO. CO. N.Y. (OSBORNE'S PROCESS)

David Russell
Letters Patent

The Schedule referred to in these Letters Patent and making part of the same, containing a description in the words of the said David Russell himself of his improvement in the "Portable Saw Mill."

---

Be it known that I David Russell of the town of Tuscumbia in the County of Franklin & State of Alabama, have made a new and useful improvement in the useful arts, being a machine for sawing lumber, called "Russell's portable Saw Mill", which is described as follows, reference being had to the annexed drawings of the same, making part of this Specification.

A, represents the frame, constructed about 15 feet long, 7 feet wide, & 10 feet high, of any convenient number of pieces of timber of sufficient strength and well braced by diagonal braces — B, B, two joints of the frame, each about 11 feet long, placed at the ends thereof, and may be one or more as required. C, C, Two Bottom joints supporting the machine, and may be turned up out of the way when the Machine is to be moved from place to place. D, D, Frames & wheels for moving the machine — E, E. Rail-ways plated with iron for the carriage to run upon. F. The carriage made in joints in such a manner that it may be lengthened or shortened at pleasure having rollers on the under side turning on the rail-ways and having cogged segments or racks on its under sides into which the pinions work for moving it. G. H. Head & tail blocks on which the timber to be sawed rests and is secured. I. the pinions before mentioned working into the racks of the Carriage, which pinions are fixed on the axle K, on the end of which is a drum & cog wheel M. N. the saw connected to a pitton rod O passing through an aperture in the cap piece of the frame and connected with two springs. P, P. The saw works vertically between guides Q Q — the have slides R, R, sliding up & down on the guides. The lower end of the saw is connected to the crank of the fly wheel by the pitman rod S.

9204X

The gearing consists of a horizontal cog wheel T about 4 feet in diam
eter fixed on a vertical shaft U, which is turned by a horse attach
ed to the lever V, of the shaft. A pinion W on the end of a horizontal
shaft X, works into the horizontal cog wheel, by which the horizontal
shaft is turned, on the end of which is a pulley or band wheel Y.
5 feet in diameter around which passes a band Z leading to the
pulley a on the axle b of the fly wheel. On the horizontal shaft
is another pulley c two feet in diameter around which passes
a band leading to the drum on the rag wheel shaft for running
the carriage back. On the other end of the fly wheel shaft is another
crank f to which is attached a connecting rod g which is connected
to an elbow h turning on a journal, on the end of which elbow is attach
ed the feed hand e working in the rag wheel for feeding the machine Operation — The carriage is run back, the log rolled upon the
head and tail blocks and secured by the dogs — the machine is
put in motion — the feed hand dropped into the rag wheel — the
horizontal cog wheel turns the pinion on the end of the horizontal
shaft which is turned with the pulley thereon and the band
passing around it turns the pulley and shaft of the fly wheel
which turns the cranks on its shaft. One of the cranks works
the saw up and down with the aid of the springs, while the other
crank at the same time operates the feed hand — this turns
the rag wheel which turns the shaft and pinions — these mashing
into the racks of the carriage bring the carriage forward with
the log to be sawed. When the log is sawed through from end to end
the hand is lifted from the rag wheel which runs the carriage back
the hand is again dropped into the rag wheel and the operation
continued till the log be entirely sawed — the machine is stopped.

This machine may be propelled by bands or by cogged gearing of
wood or iron, and may be made double or single to drive one or
more saws or gangs of saws, by water, steam, or horse power, and
may be portable or fixed of such size to suit the convenience of the Builder 9204X 143

What I claim as my invention and which I desire to secure by Letters Patent, consists in the combination and arrangement of the several parts of the before described Sash Mill.

Witnesses David Russell

Wm. P. Elliott

Sam. Stillinger (Drawing.)

(812 words)